United States Patent
Victor

(10) Patent No.: US 7,383,588 B2
(45) Date of Patent: Jun. 10, 2008

(54) BODY WRAP

(76) Inventor: Diane A. Victor, 6130 Wing Lake Rd., Bloomfield Hills, MI (US) 48301

( * ) Notice: Subject to any disclaimer, the term of this patent is extended or adjusted under 35 U.S.C. 154(b) by 162 days.

(21) Appl. No.: 11/534,774

(22) Filed: Sep. 25, 2006

(65) Prior Publication Data
US 2008/0092271 A1    Apr. 24, 2008

(51) Int. Cl.
A41D 13/08    (2006.01)
(52) U.S. Cl. ............... 2/16; 2/22; 2/69; 2/170
(58) Field of Classification Search ............ 2/16, 2/170, 308, 311, 337, 123, 162, DIG. 3, DIG. 10; 128/878, 882, 879; 602/6, 13, 18, 20, 21, 602/22, 26, 27, 30, 5, 75
See application file for complete search history.

(56) References Cited
U.S. PATENT DOCUMENTS

| | | | | |
|---|---|---|---|---|
| 4,724,548 A | * | 2/1988 | London | 2/338 |
| 5,033,122 A | * | 7/1991 | Smith | 2/209.3 |
| 5,113,533 A | * | 5/1992 | Takada | 2/170 |
| 5,520,626 A | * | 5/1996 | Schaeffer | 602/22 |
| 5,857,217 A | * | 1/1999 | Hsueh | 2/170 |
| 5,978,964 A | * | 11/1999 | Gaston | 2/69 |
| 2004/0139533 A1 | * | 7/2004 | Kurpis | 2/468 |
| 2005/0039242 A1 | * | 2/2005 | Edmondson | 2/207 |
| 2006/0185059 A1 | * | 8/2006 | Taha et al. | 2/170 |

* cited by examiner

Primary Examiner—Katherine Moran
Assistant Examiner—Sally C Cline
(74) Attorney, Agent, or Firm—Gifford, Krass, Sprinkle, Anderson & Citkowski, PC

(57) ABSTRACT

A wrap for a body part such as a human wrist. The wrap includes an elongated flexible and helical-shaped member which is constructed of a material having shape memory so that, upon release of the member following deflection of the member, the member returns to its original helical shape. A covering is disposed around the member which either absorbs perspiration or applies a medication.

10 Claims, 2 Drawing Sheets

BODY WRAP

BACKGROUND OF INVENTION

I. Field of the Invention

The present invention relates generally to wraps for a human body.

II. Description of Related Art

Body wraps are conventionally used to absorb perspiration during physical exertion such as exercising or engaging in a sport. For example, tubular cylindrical wristbands are oftentimes slid over the wearer's hand and around the wrist to absorb perspiration and protect the wearer's hand from perspiration. Such sweatbands, for example, are oftentimes used in the game of tennis.

One disadvantage of these previously known sweatbands, however, is that the sweatband must be slid over the user's hand in order to position it around the wrist and, likewise, slid over the user's hand after use. Such positioning of the sweatband around the user's wrist and removal of the sweatband from the user's wrist is cumbersome and oftentimes an undesirable procedure.

A still further disadvantage of these previously known sweatbands is that such sweatbands typically include an elastic material in order to maintain the contact between the sweatband and the user's wrist. The constant stretching of the elastic material while positioning the sweatband onto the user's wrist or removing the sweatband from the user's wrist stretches the elastic material. Repeated stretching of the elastic material may result in its deterioration to the extent that the sweatband may no longer be used.

A still further disadvantage of these previously known sweatbands is that the sweatband typically comprises a single band encompassing the user's wrist or other body part. This single loop, furthermore, is only capable of absorbing a limited amount of perspiration. Consequently, in some situations, it is necessary to frequently remove the sweatband and replace it with a fresh sweatband.

SUMMARY OF THE PRESENT INVENTION

The present invention provides a wrap for a body part, such as the wrist, which overcomes all of the above-mentioned disadvantages of the previously known devices.

In brief, the wrap of the present invention comprises an elongated, flexible and helical-shaped member having a size dimensioned to snugly fit around a body part, such as a human wrist, arm, head and the like. This member, furthermore, is constructed of a material having shape memory so that, upon release of the member following deflection of the member, the member returns to its original helical shape. Preferably, the member is constructed of a plastic or rubber material.

A covering is disposed around the member. In one embodiment, the covering includes a perspiration-absorbent material so that, with the wrap disposed around a body part, the covering absorbs perspiration which contacts the wrap. This covering, furthermore, may include several layers including a perspiration-absorbent layer, such as super-absorbent microfiber, as well as an outer fabric layer.

In practice, the wrap is simply positioned directly around the desired body part, such as a wrist, by deflecting the member and wrapping the member directly around the wrist or the body part. Upon release, the member returns, or at least partially returns, to its original helical shape thus snugly holding the wrap around the wrist or other body part.

In an alternative embodiment of the invention, the covering may include a medication-absorbent material. Consequently, with the medication-absorbent material filled with the desired medication and the wrap applied around the body part, the wrap maintains contact of the medication against the wearer's skin. Such medications typically promote healing, reduce pain and the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
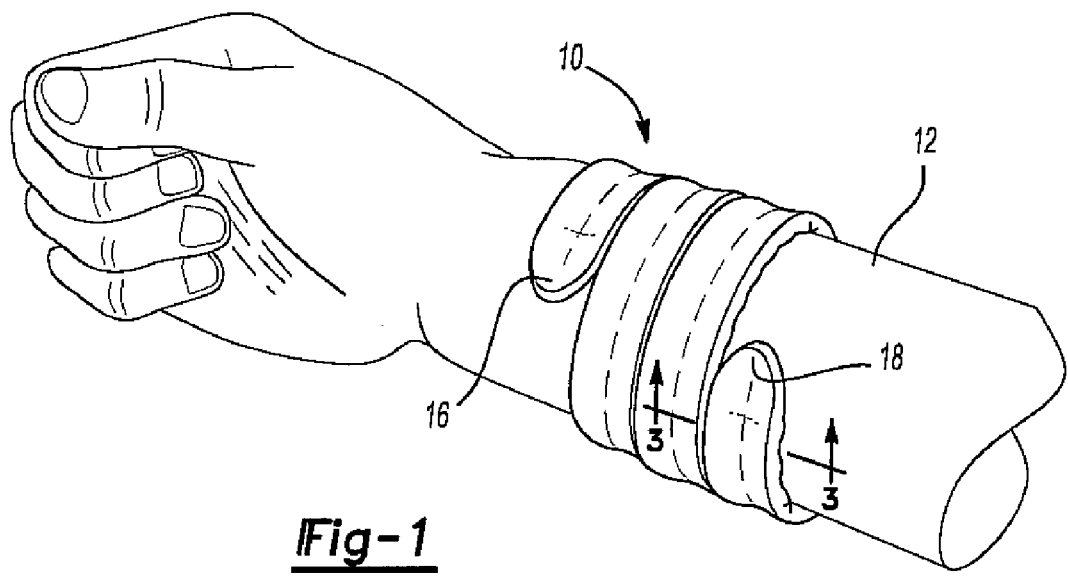
FIG. 1 is a fragmentary elevational view illustrating a preferred embodiment of the present invention.

With reference first to FIG. 1, a preferred embodiment of a wrap 10 according to the present invention is illustrated disposed around a wrist 12 of a human. The wrap 10 is elongated and helical in shape and dimensioned such that, with the wrap 10 disposed around the wrist 12, the wrap 10 encircles the wrist 12 several times.

It will be understood, however, that the wrap 10 may be disposed around any desired human part and that the wrist 12 illustrated in FIG. 1 is by way of example only. For example, the wrap 10 may be disposed around the upper arm, the head, the torso, legs, etc. The actual dimensions of the wrap 10 will vary, of course, as a function of its application and the particular body part around which the wrap 10 is intended to be disposed.

Figure 4:
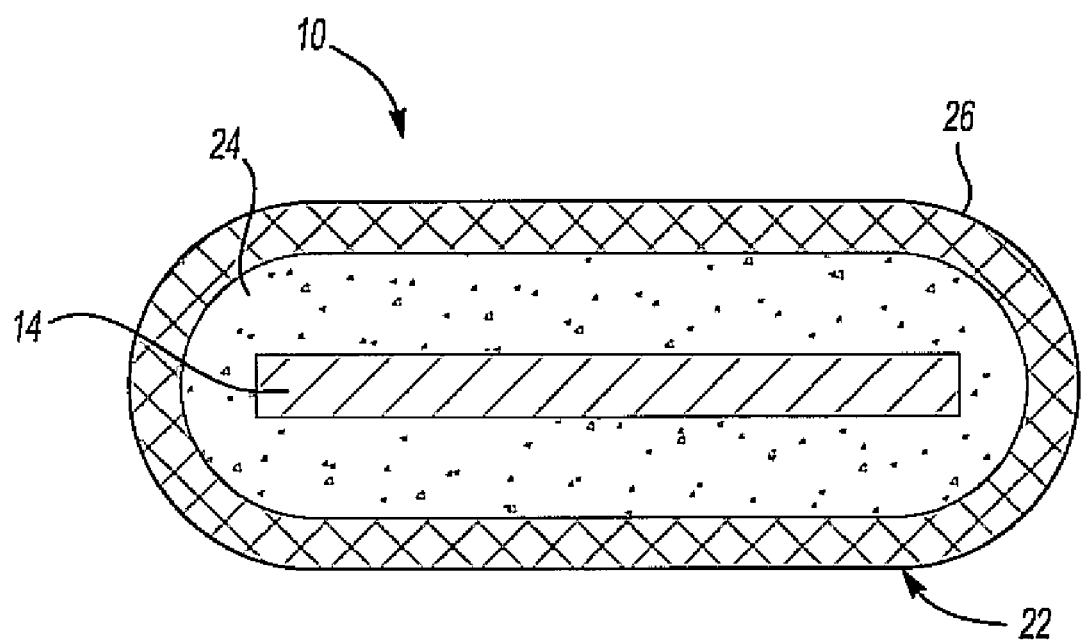
FIG. 4 is a view similar to FIG. 2, but illustrating a modification thereof.

With reference now to FIGS. 1 and 4, the wrap 10 includes an elongated, flexible and helical-shaped member 14 which extends from adjacent one end 16 of the wrap 10 to adjacent its other end 18. This member 14, furthermore, is constructed of a material having shape memory so that, upon release of the member 14 following deflection of the member 14, the member 14 returns or at least attempts to return to its original helical shape. Preferably, the member 14 is constructed of a plastic material or rubber, although other materials may alternatively be used.

Figure 3:
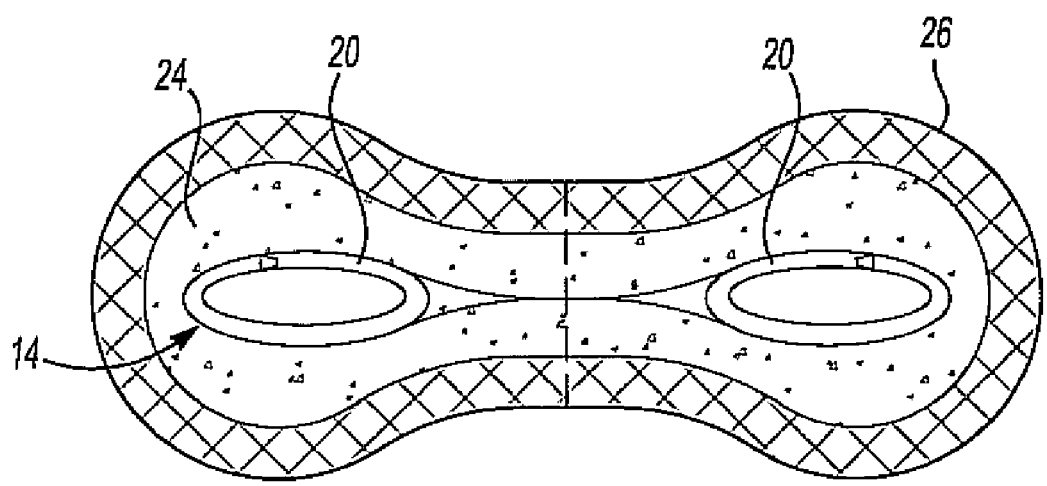
FIG. 3 is a sectional view taken substantially along line 2-2 in FIG. 1 and enlarged for clarity.

Still referring to FIG. 4, the member 14 is illustrated in the shape of a flat band. However, other shapes may alternatively be used. For example, an alternative form for the member 14' is illustrated in FIG. 3 as comprising two spaced apart non-concentric oval tubes 20. Other shapes, such as solid ovals or cylinders or cylindrical tubes, may also be used. These tubes 20, like the band 19, are preferably constructed of a plastic or rubber material, although other materials may be used without deviation from the spirit or scope of the invention.

As best shown in FIG. 4, the wrap 10 further comprises a covering 22 which is disposed around and encases the member 14. The covering 22 may comprise any material which follows the shape of the member 14. However, in a preferred embodiment of the invention, the covering 22 includes an inner layer 24 of perspiration-absorbent material, such as super-absorbent microfiber, covered by an outer fabric layer 26. Preferably the fabric layer 26 as well as the perspiration-absorbent material 24 is made of a washable material so that, following use, the entire wrap 10 may be placed in a conventional washing machine and cleaned.

Alternatively, the outer covering 26 may be made of a material which absorbs a medication to promote healing, deaden pain, etc. In that case, the wrap 10 when disposed around the wrist 12 or other body part maintains the fabric layer 26 in contact with the wearer's skin thus maintaining contact between the medication and the wearer's skin as desired. In this case the wrap 10 eliminates the need for an adhesive to hold a pad to the body part. This is particularly advantageous when the person is allergic to the adhesive and for children where the removal of an adhesive wrap is painful.

Figure 2:
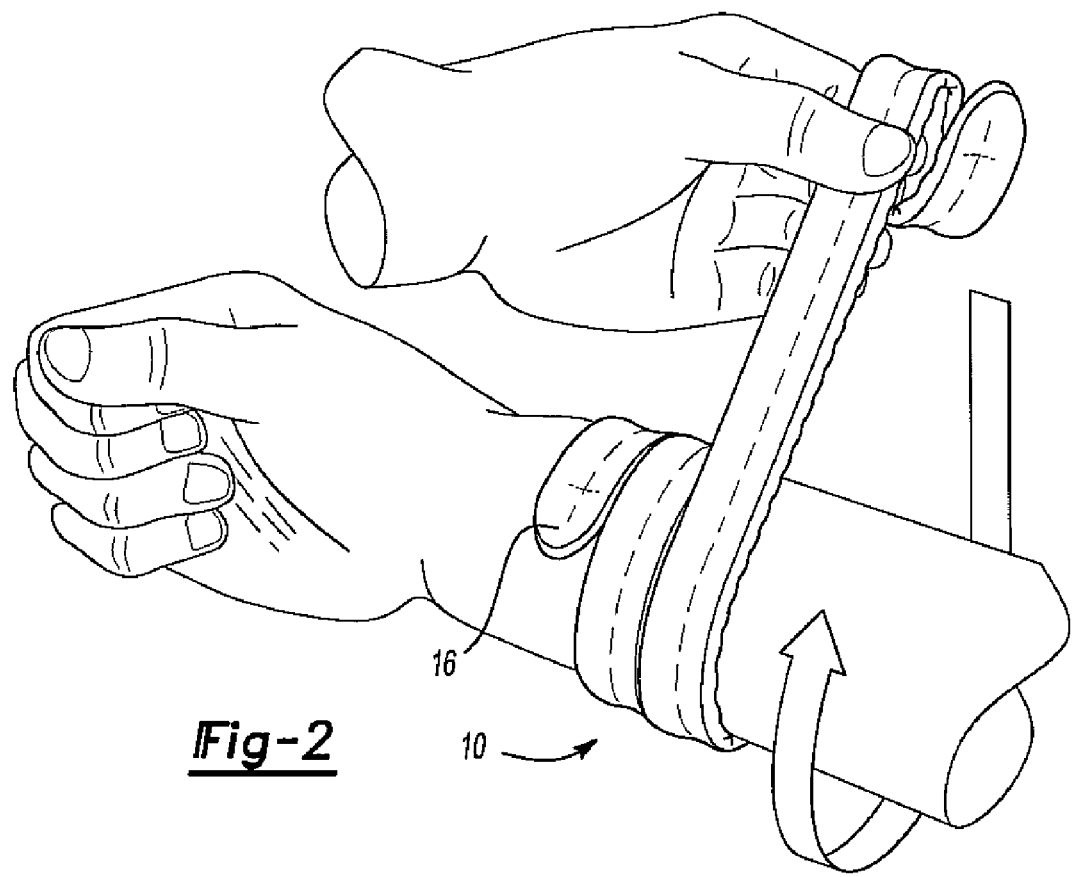
FIG. 2 is a view similar to FIG. 1 and illustrating the application of the wrap around a wearer's wrist.

With reference now to FIGS. 1 and 2, in order to position the wrap 10 around the body part, such as a wrist, the entire wrap 10 is simply deflected and wrapped directly around the wrist 12 as shown in FIG. 2 until the wrap is ultimately positioned around the wrist as shown in FIG. 1. Furthermore, the diameter of the helical member 14 when at rest is somewhat smaller than the diameter of the wrist 12. Consequently, once the wrap is positioned around the wrist 12, the helical member 14 snugly compresses the covering 22 against the wrist 12 to absorb perspiration or apply medication as desired.

It can thus be seen that the wrap 10 of the present invention provides several advantages over the previously known devices. In particular, the wrap 10 may be applied directly to the body part, such as a wrist, head, etc., without the necessity of sliding the wrap 10 over the hand as with the previously known devices. Furthermore, since the wrap 10 is preferably dimensioned to encircle the wrist or other body part several times, the wrap 10 provides increased absorption of perspiration as compared to the previously known devices.

Consequently, the wrap of the present invention is particularly advantageous for persons who are mobility impaired, such as the aged, arthritic persons, disabled persons, etc.

Having described my invention, however, many modifications thereto will become apparent to those skilled in the art to which it pertains without deviation from the spirit of the invention as defined by the scope of the appended claims.

I claim:

1. A wrap for a body part comprising:
an elongated, flexible and helical-shaped member having a length such that the member completely encircles the body part more than twice and a diameter less than the diameter of the body part, said member being constructed of a material having shape memory so that, upon release of said member following deflection of said member, said member returns to it original helical shape and compresses the member against the body part,
a covering disposed around said member; and
wherein said member comprises a pair of spaced apart and parallel non-concentric tubes, each tube having substantially the same cross-sectional shape and size.

2. The invention as defined in claim 1 wherein said member comprises a flat band.

3. The invention as defined in claim 1 wherein said member comprises a tube.

4. The invention as defined in claim 1 wherein said member comprises a synthetic polymeric material.

5. The invention as defined in claim 1 wherein said covering comprises a perspiration-absorbing material.

6. The invention as defined in claim 1 wherein said covering comprises an inner layer of perspiration-absorbing material and an outer layer of fabric.

7. The invention as defined in claim 1 wherein said covering comprises an outer layer of medication-absorbent material.

8. The invention as defined in claim 1 wherein said member is dimensioned to fit snugly around a human wrist.

9. The invention as defined in claim 1 wherein said covering comprises a layer of super-absorbent microfiber.

10. The invention as defined in claim 1 wherein said member comprises a rubber material.

* * * * *